US007360408B2

(12) United States Patent
Dingler et al.

(10) Patent No.: US 7,360,408 B2
(45) Date of Patent: Apr. 22, 2008

(54) METHOD FOR DETERMINING A FUEL PRESSURE RELATED FAULT AND OPERATING AN INTERNAL COMBUSTION ENGINE BASED ON THE FAULT

(75) Inventors: Thomas Dingler, Stuttgart (DE); Stefan Lauter, Asperg (DE); Achim Degel, Illingen (DE)

(73) Assignee: Robert Bosch GmbH, Stuttgart (DE)

( * ) Notice: Subject to any disclaimer, the term of this patent is extended or adjusted under 35 U.S.C. 154(b) by 54 days.

(21) Appl. No.: 10/577,213

(22) PCT Filed: Jun. 4, 2004

(86) PCT No.: PCT/DE2004/001160

§ 371 (c)(1), (2), (4) Date: Apr. 25, 2006

(87) PCT Pub. No.: WO2005/045221

PCT Pub. Date: May 19, 2005

(65) Prior Publication Data

US 2007/0079792 A1 Apr. 12, 2007

(30) Foreign Application Priority Data

Nov. 6, 2003 (DE) ................................ 103 51 893

(51) Int. Cl.
*G01M 15/00* (2006.01)

(52) U.S. Cl. ....................................... 73/118.1; 73/49.7

(58) Field of Classification Search .................... 73/40, 73/46, 47, 49.7, 112, 113, 115, 116, 117.2, 73/117.3, 118.1, 119 A, 119 R
See application file for complete search history.

(56) References Cited

U.S. PATENT DOCUMENTS

| | | | | |
|---|---|---|---|---|
| 5,708,202 | A | 1/1998 | Augustin et al. | |
| 6,311,548 | B1 * | 11/2001 | Breidenbach et al. | 73/40 |
| 6,321,593 | B1 * | 11/2001 | Rich | 73/118.1 |
| 6,807,847 | B2 * | 10/2004 | Steckler et al. | 73/49.7 |
| 6,907,780 | B1 * | 6/2005 | Meagher | 73/299 |
| 2005/0115314 | A1 * | 6/2005 | Meagher | 73/290 B |

FOREIGN PATENT DOCUMENTS

| | | |
|---|---|---|
| DE | 196 22 757 | 5/1997 |
| DE | 197 27 794 | 1/1999 |
| DE | 101 36 706 | 2/2002 |
| DE | 100 61 855 | 8/2002 |
| EP | 0 899 442 | 3/1999 |
| JP | 6213051 | 8/1994 |
| JP | 10089135 | 4/1998 |

* cited by examiner

*Primary Examiner*—Eric S. McCall
(74) *Attorney, Agent, or Firm*—Kenyon & Kenyon LLP

(57) ABSTRACT

The invention relates to a method for operating a combustion engine (1) comprising a fuel-driven heat engine (5), which permits a differentiation of faults during the supply of fuel. To this end, the fuel is supplied under pressure to the heat engine (5) via a fuel supply (10). A pressure reduction speed in the fuel supply (10) is determined, and a fault is inferred based on a comparison of the pressure reduction speed with a predetermined threshold value.

10 Claims, 2 Drawing Sheets

METHOD FOR DETERMINING A FUEL PRESSURE RELATED FAULT AND OPERATING AN INTERNAL COMBUSTION ENGINE BASED ON THE FAULT

FIELD OF THE INVENTION

The present invention relates to a method for operating an internal combustion engine.

BACKGROUND INFORMATION

Several methods for operating an internal combustion engine having a fuel-driven combustion motor are conventional. In this context, fuel is conveyed under pressure to the combustion motor via a fuel delivery system, the pressure in the fuel delivery system being regulated to a setpoint.

SUMMARY

A method according to an example embodiment of the present invention may have an advantage that a pressure decay rate in the fuel delivery system is determined; and that a fault is inferred as a function of a comparison of the pressure decay rate with a predefined threshold. In this fashion, all the sealing failures in a high-pressure circuit of the fuel delivery system can be recognized, and can be differentiated from other faults in the fuel supply system.

It may be particularly advantageous if for the case in which an actual value for the pressure does not reach the setpoint during a predefined time, a fault is recognized and the pressure decay rate in the fuel delivery system is determined; and that the type of fault is determined as a function of a comparison of the pressure decay rate with the predefined threshold value. It is possible in this fashion to differentiate various fault causes for the system deviation between the actual value of the pressure and the setpoint. This differentiation is additionally possible during operation of the internal combustion engine. Differentiation of the causes of faults simplifies, for example, diagnosis at a repair shop.

It may be particularly advantageous if an emergency mode action is initiated as a function of the type of fault. It is thereby possible to achieve enhanced availability of the internal combustion engine, since the internal combustion engine can continue to be operated depending on the type of fault.

A further advantage may be obtained if a leak in the fuel delivery system is recognized in the event the absolute value of the pressure decay rate exceeds the predefined threshold value. A leak in the fuel delivery system can thereby be recognized in particularly simple and reliable fashion.

A further advantage may be obtained if the internal combustion engine is shut off once a leak in the fuel delivery system is recognized. This ensures reliable operation of the internal combustion engine. This may be important especially when the internal combustion engine is driving a vehicle, in which case driver safety is enhanced.

A further advantage may be obtained if restarting of the internal combustion engine is blocked once a leak in the fuel delivery system is recognized. This prevents the internal combustion engine from being put into operation before the fault has been resolved. This likewise ensures safety during operation of the internal combustion engine.

It may be furthermore particularly advantageous if a fault in the fuel supply system is recognized when the absolute value of the pressure decay rate falls below the predefined threshold value. In this fashion, a fault is detected that does not require shutdown of the internal combustion engine, but instead allows continued operation. The availability of the internal combustion engine is thereby enhanced.

A further advantage may be obtained if a limitation of the quantity of fuel delivered is activated once a fault in the fuel supply system has been recognized. This allows implementation of an emergency operating mode of the internal combustion engine at decreased output.

It may be additionally advantageous if, once a fault has been recognized, the internal combustion engine is also shut off, regardless of the type of fault, when the internal combustion engine is being operated at idle or at low load below a predefined load threshold. This takes into account the fact that at idle or a low load, continued operation of the internal combustion engine is no longer usefully possible if the actual value for the pressure in the fuel delivery system is no longer reaching the setpoint.

A further advantage may be obtained if, for the determination of the pressure decay rate, a high-pressure circuit is separated from a low-pressure circuit of the fuel delivery system, and the pressure decay rate in the high-pressure circuit is determined. The pressure decay rate can thereby be determined in particularly simple fashion.

A further advantage may be obtained if a warning message is transmitted once a fault has been recognized. The operator of the internal combustion engine (the driver of the vehicle, in the case of a vehicle) is thereby informed as to the existence of a fault.

BRIEF DESCRIPTION OF THE DRAWINGS

An exemplifying embodiment of the present invention is depicted in the figures and explained in more detail in the following description.

DETAILED DESCRIPTION OF EXAMPLE EMBODIMENTS

Figure 1:
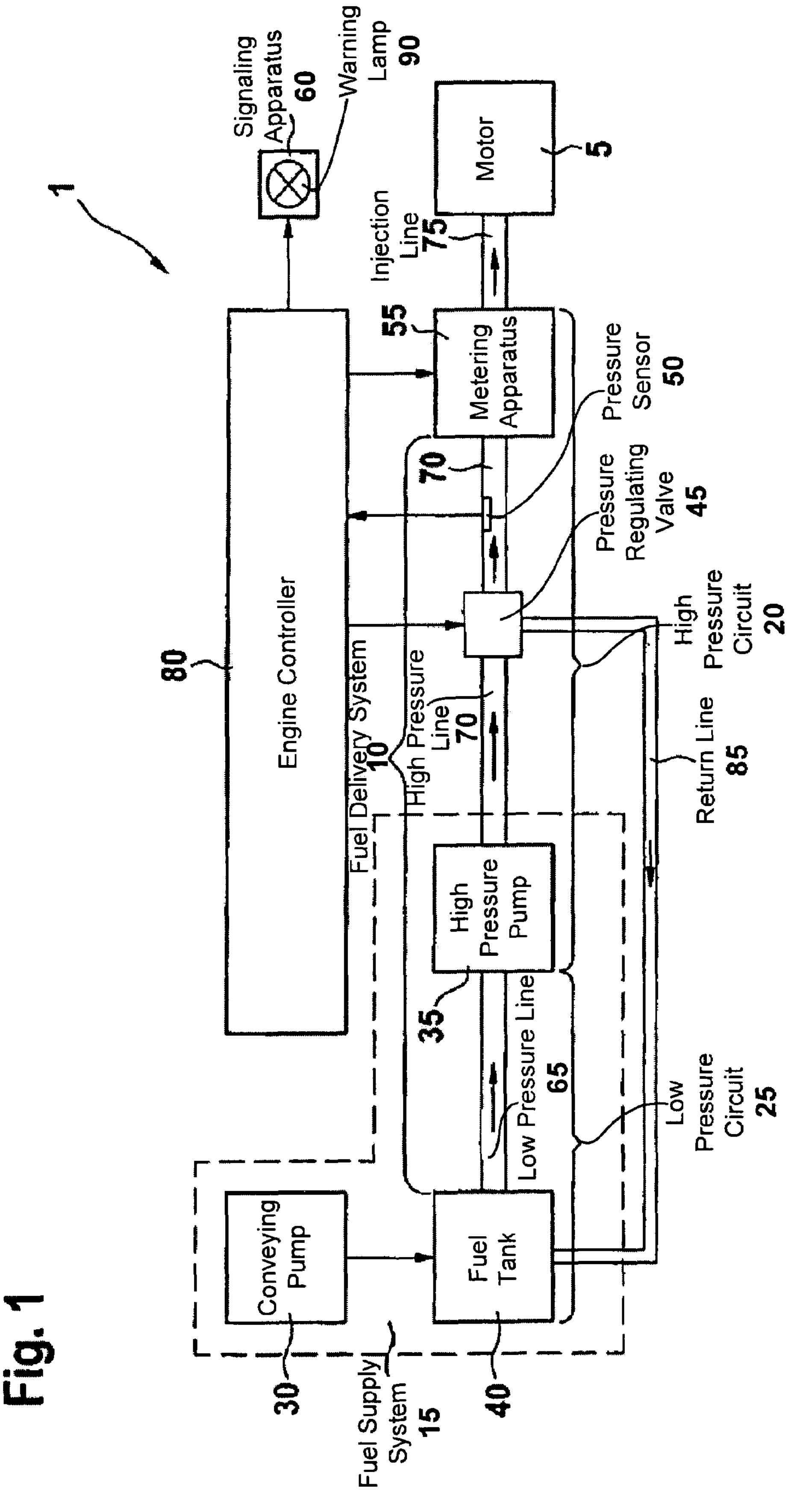
FIG. 1 is a block diagram of an internal combustion engine having a fuel delivery system to a combustion motor.

In FIG. 1, 1 designates an internal combustion engine that, for example, drives a vehicle. Internal combustion engine 1 encompasses a fuel-operated combustion motor 5 that can be embodied, for example, as a spark-ignited engine or diesel engine.

Internal combustion engine 1 furthermore encompasses a fuel supply system 15 that supplies fuel to combustion motor 5 through a fuel delivery system 10. Fuel supply system 15 encompasses a mechanically or electrically driven conveying pump 30 that pumps fuel out of a fuel tank 40 into fuel delivery system 10 toward combustion motor 5. A (for example, mechanical) pressure regulator having a pressure valve can be connected in parallel with conveying pump 30. A fuel filter can also be disposed at the outlet of fuel tank 40. This is not depicted in FIG. 1 for reasons of clarity. From fuel tank 40, fuel is pumped first into a low-pressure line 65, in which context conveying pump 30 generates, for example, an inlet pressure of approximately 3.5 bar. The pressure to be established in low-pressure line 65 can be implemented, for example, by the parallel-connected pressure regulator having the pressure valve. This feeds into a high-pressure pump 35 driven, for example, by combustion motor 5. The purpose of high-pressure pump 35 is to raise the fuel pressure from the inlet pressure of, for example, approximately 3.5 bar to, for example, approximately 120 bar. High-pressure pump 35 conveys fuel into a high-pressure line 70 toward combustion motor 5. Disposed in high-pressure line 70 is a pressure regulating valve 45 that is triggered by an engine controller 80 and is adjusted depending on the setpoint to be established for the pressure in high-pressure line 70. Any undesired overpressure is reduced via a return line 85, by the fact that correspondingly excess fuel is returned to fuel tank 40 through return line 85. A metering unit or other apparatus for adjusting the delivery quantity, which can likewise handle pressure regulation, can moreover be integrated into high-pressure pump 35. In this case the pressure regulating valve is controlled or, if applicable, additionally regulated. A variant without a pressure regulating valve can also be used. In this example, however, it will be assumed that pressure regulating valve 45 is used.

Disposed after pressure regulating valve 45 in the fuel flow direction in high-pressure line 70 is a pressure sensor 50 that detects the fuel pressure in high-pressure line 70 and forwards it to engine controller 80. The fuel flow direction is indicated in FIG. 1 by arrows in the individual lines 65, 70, 85. Disposed after pressure sensor 50 in the fuel flow direction is a metering apparatus 55 that encompasses, for example, one or more injection valves with which the quantity of fuel to be injected into a combustion chamber of combustion motor 5 can be adjusted in a conventional manner. For that purpose, metering apparatus 55 is likewise triggered by engine controller 80 to achieve a predefined fuel quantity to be injected. Fuel can be injected directly into one or more cylinders of combustion motor 5 or into an intake duct through which the fuel, together with air, is delivered to combustion motor 5. FIG. 1 symbolically depicts an injection line 75 through which fuel is delivered from metering apparatus 55 to combustion motor 5. Also depicted is a signaling apparatus 60 having a warning lamp 90 that is triggered by engine controller 80. As described, fuel supply system 15 encompasses conveying pump 30, fuel tank 40, low-pressure line 65, and high-pressure pump 35. A low-pressure circuit 25 encompasses fuel tank 40, conveying pump 30, and low-pressure line 65, as well as the parallel-connected pressure regulator (not depicted). Any undesired overpressure in low-pressure line 65 can once again be relieved, for example, via return line 85; this is not depicted in FIG. 1 for reasons of clarity. In low-pressure circuit 25, the fuel pressure in low-pressure line 65 is therefore regulated by way of the pressure valve (not depicted). A high-pressure circuit 20 encompasses high-pressure pump 35, high-pressure line 70, pressure regulating valve 45, pressure sensor 50, and metering apparatus 55. In high-pressure circuit 20, the fuel pressure in high-pressure line 70 is regulated by way of pressure regulating valve 45 or the metering unit installed in high-pressure pump 35. Fuel delivery system 10 encompasses low-pressure line 65, high-pressure pump 35, high-pressure line 70, pressure regulating valve 45, and pressure sensor 50.

In accordance with an example embodiment of the present invention, engine controller 80 determines, on the basis of pressure sensor 50, the actual fuel pressure value in high-pressure line 70 and compares it with a predefined setpoint, for example 120 bar. In the case of a positive system deviation recognized by engine controller 80, in which the setpoint is greater than the actual value and is not reached by the actual value within a predefined time as a result of corresponding triggering of pressure regulating valve 45, engine controller 80 identifies a fault. The predefined time is suitably selected, for example, on the one hand to tolerate short-term fluctuations of the actual value and on the other hand to detect the fault promptly. A suitable value for the predefined time can be, for example, one second. Engine controller 80 can indicate the fault by activating signaling apparatus 60, in this example by activating warning lamp 90. Signaling apparatus 60 can also, additionally or alternatively, encompass an acoustic warning apparatus that is activated upon detection of a fault by engine controller 80. Immediately after recognition of the fault or after a short delay time of, for example, once again one second, engine controller 80 causes a shutoff of the injection system by corresponding triggering of metering apparatus 55 or of the injection valve or valves. For that purpose, the injection valve or valves is or are inhibited. Engine controller 80 then attempts, by corresponding triggering of pressure regulating valve 45 or of the metering unit in high-pressure pump 35, to establish a maximum possible setpoint for the fuel pressure in high-pressure line 70. This setpoint can be, for example, 120 bar. If the maximum possible setpoint cannot be established, for example once again within the predefined time of, for example, one second, engine controller 80 causes the fuel pressure in high-pressure line 70 to be set, by corresponding triggering of pressure regulating valve 45, to the highest achievable setpoint, in this example less than 120 bar. If this setpoint is reached by the actual value, high-pressure circuit 20 is then separated from low-pressure circuit 25 by the fact that pressure regulating valve 45 and the metering unit in high-pressure pump 35 are closed by engine controller 80, and metering apparatus 55 and therefore the fuel injection system are completely inhibited, metering apparatus 55 already having been inhibited previously. The pressure decay rate is then determined on the basis of the signal of pressure sensor 50, for which purpose engine controller 80 calculates the change in pressure over time from the signal of pressure sensor 50. The change in pressure over time is the pressure decay rate if it is negative, i.e., if the change in pressure is negative. The pressure decay rate that is determined is compared by engine controller 80 with a predefined threshold value. If the absolute value of the pressure decay rate is greater than the predefined threshold value, a leak in high-pressure circuit 20, specifically in high-pressure line 70, must be assumed. The predefined threshold value can be selected so that a natural pressure loss as a result of tolerable sealing failures, such as those that occur, for example, because of the material of high-pressure line 70 and the installation of pressure regulating valve 45 and pressure sensor 50, and the attachment to high-pressure pump 35 and metering apparatus 55 (e.g. valves with a continuous leakage in the return direction), result in a pressure decay rate whose absolute value is below the predefined threshold value, and so that the absolute value of the pressure decay rate exceeds the predefined threshold value only in the case of an actual leak in high-pressure line 70. The predefined threshold value can be determined appropriately from experimental runs on a test stand. If the type of fault detected is therefore a fault in high-pressure circuit 20, in particular because of a leak in high-pressure line 70, engine controller 80 can therefore shut off internal combustion engine 1 as a fault action, for example by inhibiting air delivery and/or ignition (the latter in the case of a spark-ignition engine). In addition, engine controller 80 can block restarting of internal combustion engine 1, once again by, for example, inhibiting air delivery and/or ignition. If the absolute value of the pressure decay rate is below the predefined threshold value, the type of fault recognized is a problem in fuel supply system 15, in which case high-pressure circuit 20 is tight and no hazard due to leaking fuel can be expected. In this case the cause of the fault is, for example, that conveying pump 30 or high-pressure pump 35 cannot be operated at full output. Internal combustion engine 1 can then at least continue to be operated at reduced output.

The above-described determination of the type of fault can occur within a short period, for example within a few seconds, so that internal combustion engine 1, or a vehicle driven by it, does not become substantially slower during that determination. Application of the method according to the present invention is useful, in particular, when internal combustion engine 1 is in a moderate- to high-load operating range. If the above-described positive system deviation occurs for at least the predefined time at low load or at idle, further operation of internal combustion engine 1 is usually no longer usefully possible, and is therefore terminated by engine controller 80, for example in the manner described, regardless of the type of fault. The load can be determined by engine controller 80, in a conventional manner (and not depicted in FIG. 1), as a function of a mass air flow delivered to combustion motor 5, an accelerator pedal position in the case of a vehicle, a position of an actuating element (e.g., a throttle valve) for influencing air delivery, the quantity of fuel injected, or the like. A corresponding load signal is then compared with a predefined load threshold value in order to distinguish a low load or idle from a moderate or higher load. The predefined load threshold value can be suitably selected on a test stand in such a way that in the event of a positive system deviation for at least the predefined time, load values below the predefined load threshold value no longer result in useful operation of internal combustion engine 1, but so that at load values above the predefined load threshold value, internal combustion engine 1 can be operated without difficulty for at least the predefined time even in the event of a positive system deviation.

Figure 2:
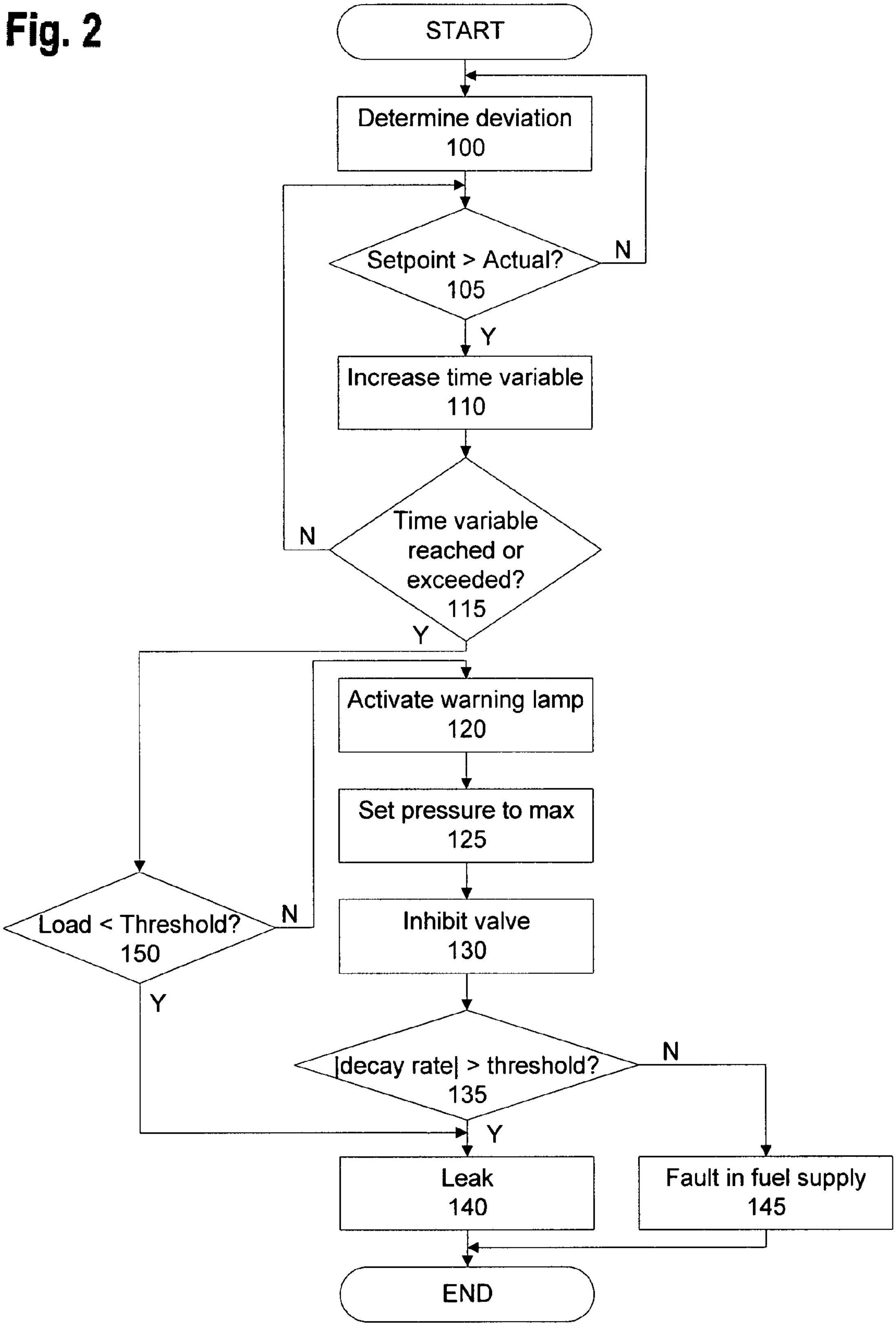
FIG. 2 is a flow chart for an example sequence of the method according to the present invention.

The method according to an example embodiment of the present invention is explained below, by way of example, with reference to a flow chart as shown in FIG. 2. After the program starts, at a program point 100 engine controller 80 determines the system deviation between the setpoint and actual value of the fuel pressure in high-pressure line 70. A time variable is also set to zero. Execution then branches to a program point 105.

At program point 105, engine controller 80 checks whether a positive system deviation exists, i.e., whether the setpoint is greater than the actual value. If so, execution branches to a program point 110; otherwise execution branches back to program point 100.

At program point 110, the time variable in engine controller 80 is increased by a predefined increment value, for example by 10 ms. Execution then branches to a program point 115.

At program point 115, engine controller 80 checks whether the time variable has reached or exceeded the predefined time. If so, execution branches to a program point 150; otherwise execution branches back to program point 105.

At program point 150, engine controller 80 checks whether the load that has been determined is below the predefined load threshold value. If so, execution branches to a program point 140; otherwise execution branches to a program point 120. At program point 120, engine controller 80 causes an activation of warning lamp 90 of signaling apparatus 60, thus indicating recognition of a fault. Engine controller 80 furthermore causes inhibition of metering apparatus 55 and therefore of the injection of fuel. Execution then branches to a program point 125.

At program point 125, engine controller 80, by evaluating the signal furnished by pressure sensor 50 and by triggering pressure regulating valve 45, causes the actual value of the fuel pressure in high-pressure line 70 to be set to the maximum possible, or highest achievable, setpoint. Execution then branches to a program point 130.

At program point 130, engine controller 80 causes an inhibition of pressure regulating valve 45 and therefore separation of high-pressure circuit 20 from low-pressure circuit 25. Engine controller 80 then, on the basis of the signal of pressure sensor 50, determines the pressure decay rate, i.e., the loss in fuel pressure over time, in high-pressure line 70. Execution then branches to a program point 135.

Program point 135 checks engine controller 80 as to whether the absolute value of the pressure decay rate is above the predefined threshold value. If so, execution branches to program point 140; otherwise execution branches to a program point 145.

At program point 140, engine controller 80 has detected a leak in fuel delivery system 10 as the type of fault, and as a reaction to this type of fault causes a shutoff of internal combustion engine 1, for example by interrupting air delivery and/or ignition. At program point 140 engine controller 80 can also, additionally or alternatively, block restarting of internal combustion engine 1. Execution then leaves the program.

At program point 145, engine controller 80 has detected a fault in fuel supply system 15 as the type of fault, and in reaction to this type of fault causes a reopening of metering apparatus 55 and of pressure regulating valve 45, thereby enabling continued operation of internal combustion engine 1 at least at reduced output, since the setpoint originally to be established is not being reached by the actual value of the fuel pressure in high-pressure line 70 because the positive system deviation is persisting. Engine controller 80 can trigger metering apparatus 55 in such a way that fuel injection is slowly increased in the direction toward implementation of the driver request corresponding to actuation of an accelerator pedal of the vehicle. In addition, a limitation of the quantity of fuel injected can be activated by engine controller 80 in order to prevent unnecessary fuel consumption and therefore also an unnecessary degradation in emissions, and to implement an emergency operating mode. Execution then leaves the program.

Especially in systems having leakless injectors, e.g., piezo injectors in the case of diesel injection valves or gasoline direct-injection valves in metering apparatus 55, the pressure decay in high-pressure line 70 when high-pressure circuit 20 and low-pressure circuit 25 are separated is comparatively slow, since there is no leakage in metering apparatus 55. Any additional leakage in high-pressure line 70 then results in a substantially faster pressure decay, and is thus easy to recognize using a suitably determined predefined threshold value for the pressure decay rate. In systems having a different metering apparatus 55 (e.g. solenoid valve injectors for diesel), the injector leakage present therein means that the pressure decay in high-pressure line 70 when high-pressure circuit 20 and low-pressure circuit 25 are separated is less slow compared with the pressure decay in the context of an additional leakage in high-pressure line 70. In systems having solenoid valve injectors, the additional leakage in high-pressure line 70 is therefore less easy to differentiate from the injector leakage already present, i.e., in this case the predefined threshold value for the pressure decay rate must be determined more carefully. Consideration should also be given, when selecting this threshold value, to the fact that the leakage of solenoid valve injectors increases over the service life of the solenoid valve injectors, and that a variation furthermore occurs in the leakage values of different solenoid valve injectors. The tolerance range for selecting the predefined threshold value of the pressure decay rate is thus smaller than in the case where piezo injectors are used.

The method according to the example embodiment of the present invention allows, in particular, sealing failures in high-pressure circuit 20 to be differentiated from other faults. These sealing failures can result, for example, from a leak in high-pressure line 70 or a leak in one or more injection valves of metering unit 55. Sealing failures due to a faulty injection valve occur, for example, because the injection valve can no longer close as a result of the deposition of dirt particles. In particular after internal combustion engine 1 is shut off, even minimal sealing failures in high-pressure circuit 20, for example in the context of one or more correspondingly contaminated injection valves, reduce the pressure in fuel delivery system 10. If an injection valve can no longer close, for example because of dirt particles, fuel then flows, in response to the pressure existing in fuel delivery system 10 or to gravity, into the corresponding cylinder of internal combustion engine 1. This can cause damage to combustion motor 5 the next time internal combustion engine 1 is started. This can be prevented by the above-described blockage of the restarting of internal combustion engine 1. The method according to the example embodiment of the present invention can also be carried out to ascertain the pressure decay rate in fuel delivery system 10 in accordance with the example embodiment described above, after shutdown of the internal combustion engine 1, with the injection valves closed. Delivery of fuel to combustion motor 5 is blocked in this context, provided the injection valves are sealing completely. In this case the fuel delivered to combustion motor 5 does not travel into the combustion chamber.

The method according to the example embodiment of the present invention can also be applied, in the manner described, in the context of a so-called shed test. A shed test of this kind is used to measure emissions of fuel vapor by fuel tank 40 and its components. A hot fueling system allows the behavior of fuel delivery system 10 to be tested during fueling with various types of fuel and under various simulated conditions. When utilized during the shed test in the manner described, the method according to the example embodiment of the present invention then allows conclusions to be drawn as to sealing failures in high-pressure circuit 20 or in fuel delivery system 10, and faults in fuel supply system 15.

What is claimed is:

1. A method for operating an internal combustion engine having a fuel-driven combustion motor, in which fuel is delivered under pressure to the combustion motor via a fuel delivery system, the method comprising:

regulating a pressure of the fuel to a setpoint;

recognizing a fault and determining a pressure decay rate in the fuel delivery system when an actual pressure value does not reach the setpoint during a predefined time; and determining a type of the fault as a function of a comparison of the pressure decay rate with a predefined threshold value.

2. The method as recited in claim 1, further comprising:

initiating an emergency mode action as a function of the type of fault.

3. The method as recited in claim 1, further composing:

shutting off the internal combustion engine when the fault has been recognized regardless of the type of the fault, when the internal combustion engine is at idle or at low load below a predefined load threshold.

4. The method as recited in claim 1, wherein the step of determining the pressure decay rate includes separating a high-pressure circuit from a low-pressure circuit of the fuel delivery system, and determining the pressure decay rate in the high-pressure circuit.

5. The method as recited in claim 1, further comprising:

transmitting a warning message when the fault is recognized.

6. The method as recited in claim 1, wherein the type of the fault is determined to be a fault in the fuel supply system when an absolute value of the pressure decay rate falls below the predefined threshold value.

7. The method as recited in claim 6, further comprising:

activating a limitation of a quantity of fuel delivered when the fault in the fuel supply system has been determined.

8. The method as recited in claim 1, the type of the fault is determined to be a leak in the fuel delivery system in an event that an absolute value of the pressure decay rate exceeds the predefined threshold value.

9. The method as recited in claim 8, further comprising:

shutting off the internal combustion engine when the leak in the fuel delivery system is determined.

10. The method as recited in claim 9, further comprising:

blocking a restarting of the internal combustion engine when the leak in the fuel delivery system is determined.

* * * * *